March 27, 1928.

J. T. FITZSIMMONS 1,664,358

LIGHTING AND BATTERY CHARGING SYSTEM

Filed Nov. 29, 1924

Inventor
John T. Fitzsimmons
By Spencer Small and Hardman
his Attorneys

Patented Mar. 27, 1928.

1,664,358

UNITED STATES PATENT OFFICE.

JOHN T. FITZSIMMONS, OF DAYTON, OHIO, ASSIGNOR, BY MESNE ASSIGNMENTS, TO DELCO-REMY CORPORATION, OF DAYTON, OHIO, A CORPORATION OF DELAWARE.

LIGHTING AND BATTERY-CHARGING SYSTEM.

Application filed November 29, 1924. Serial No. 752,872.

This invention relates to electric lighting and battery charging systems for automotive vehicles and more particularly to motor busses wherein the demand for lighting current is relatively great as compared with the requirements of ordinary passenger automobiles.

In electrical systems of this type the generator is driven by an internal combustion engine which propels the vehicle, and hence at a speed varying with speed of the vehicle. In such systems it is desirable to use a battery which is no larger than that required for supplying current for cranking the engine, for ignition during cranking and for supplying lighting current only while the vehicle is standing. Therefore one of the objects of the invention is to regulate the output of the generator so that there will be a supply of current for the battery and lights and ignition at the same time, and also to provide for limiting the charge rate of the battery while the engine is in operation and the lights when not burning.

Further objects and advantages of the present invention will be apparent from the following description, reference being had to the accompanying drawing, wherein a preferred embodiment of one form of the present invention is clearly shown.

Figure 2:
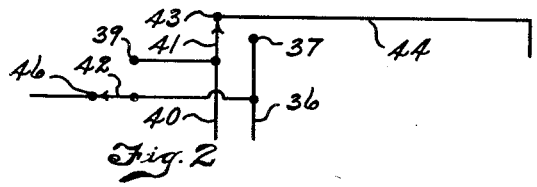
Fig. 2 is a fragmentary wiring diagram showing a modified form of the invention.

Referring to the drawings, 20 designates a generator having an armature 21 connected with main brushes 22 and 23 and with a third brush 24. Brushes 22 and 24 are connected with a shunt field winding 25. Wire 26 is connected with brush 22 and with the series winding 27 of a reverse current relay 28 which includes also a shunt or voltage winding 29. Windings 27 and 29 control the relay contacts 30 and 31 in the usual manner in order that the contacts will be closed automatically above a certain generator speed, so that the generator may be connected with a storage battery 32, and in order that the generator will be automatically disconnected from the battery when the speed of the generator falls below a certain value. Contact 31 is connected with a terminal 33 and the battery 32 with a terminal 34. Terminals 33 and 34 are connected with the series field winding 35 of the generator 20. A wire 36 connects the terminal 34 with a switch contact 37, and wire 38 connects wire 36 with a switch contact 39. Wire 40 connects terminal 33 with switch movable contacts 41 and 42. Switch contact 41 is adapted to engage contact 37 or contact 43 which is connected by wire 44 with the lamps 45. Contact 42 is adapted to engage contact 39 or contact 46 which is connected with an ignition apparatus having a primary coil winding 47, a secondary coil winding 48 and an ignition timer 49.

The operation of the invention is as follows:

The contact 41 is the main switch for controlling the lighting circuits and has an "off" position in which the contact 41 is out of engagement with contacts 43, 50 or 37. To start the engine without burning the lamps the contact 42 is moved into engagement with contact 46. The engine is cranked by the usual electric starting motor, not shown, but connected directly with the battery by a starting switch. After the engine becomes self-operative and exceeds a certain speed, the relay contacts 30 and 31 will be closed so that the generator 20 will be connected with the battery 32. The flux produced by the series field 35 opposes the flux produced by the shunt field 25 as indicated by arrows 25$^a$ and 35$^a$. Therefore while the generator is supplying current to the battery the generator operates as a differential compound machine having also third brush characteristics. The characteristics of the generator are illustrated approximately by the chart shown in Fig. 3. In the chart curve A shows the characteristic of the machine when provided with third brush regulation only, omitting the series field regulation. Since the maximum output of the machine without the bucking field regulation far exceeds the safe charging rate for a moderate size battery, the bucking series field is interposed in the battery charging circuit. When no lights are burning substantially all of the generator output goes to the battery, hence the regulating effect of the bucking field winding 35 is relatively great. Curve B illustrates the generator output when no lamps are burning and the generator is regulated by the field winding 35 in addition to third brush regulation.

To light the lamps 45, the switch contact 41 is moved into engagement with contact 43 and other individual lamp switches may be manipulated if such switches are included in the installation. Curve C illustrates the generator output at about 5 amperes lighting load; curve D, 15 amperes lighting load; and curve E, 30 amperes lighting load. It is to be noted that as the lighting load increases the amount of current delivered to the battery decreases, hence the differential effect of the series field winding decreases. The characteristic of the curve E is more nearly like that of curve A. However, it will be noted that the slope of curves B, C, D and E are all more gradual than the slope of the curve A. This is due to the regulating effect of the field 35. At relatively low engine speeds the battery discharges through the series field winding 35 so that the flux produced by winding 35 is opposite in effect as indicated by the arrow $35^b$. Since the winding 35 assists the winding 25 the generator output will be greater at low engine speeds than if the generator were regulated by third brush regulation alone. These regulation characteristics are illustrated more clearly by curve E. At 1,000 R. P. M. generator speed the output denoted by curve E is 27.5 amperes, whereas the output denoted by curve A is a little more than 20 amperes.

Figure 1:
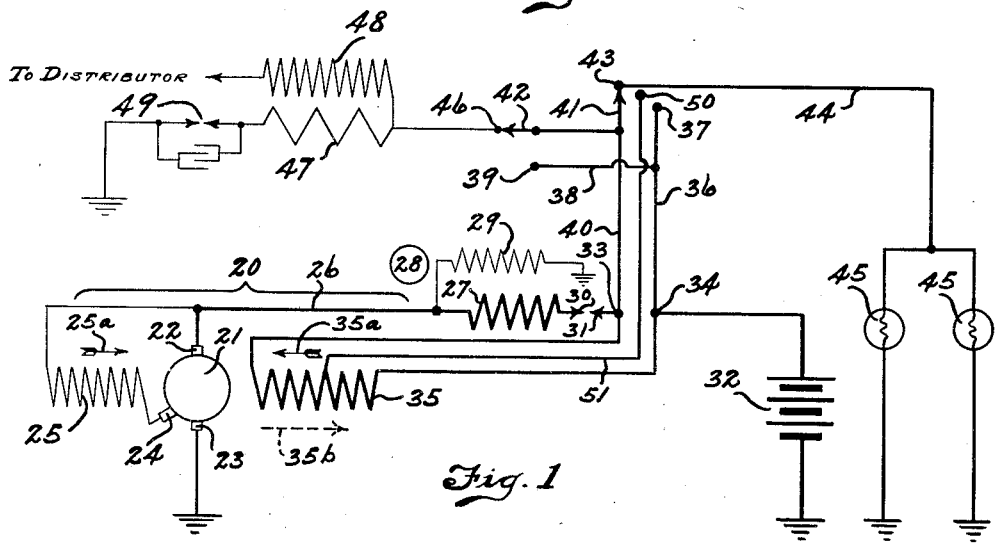
Fig. 1 is a wiring diagram illustrating a form of the invention.

The ignition switch is arranged so that in its "off" position the contact 42 will engage the contact 39. Therefore when the vehicle is standing, the engine not running, current will be supplied to the lamps 45 by the battery, the series field winding 35 being short circuited. Hence the voltage of the current to the lights will be greater than if the series winding 35 were not short-circuited. In the wiring diagram shown in Fig. 1, the ignition apparatus is connected in such a way that it will receive current at a higher voltage than the battery. This connection is desirable in order to secure maximum current in the ignition coil at high engine speeds. On the other hand the connection is not so advantageous during cranking of the engine since the ignition circuit is subject to the voltage drop through the series winding 35. In order to have greater voltage for the ignition while cranking the engine at the expense of less voltage for ignition while the engine is running, the connections to the ignition apparatus may be reversed as indicated in Fig. 2. In Fig. 2 the switch contact 42 is connected with the wire 36.

Figure 3:
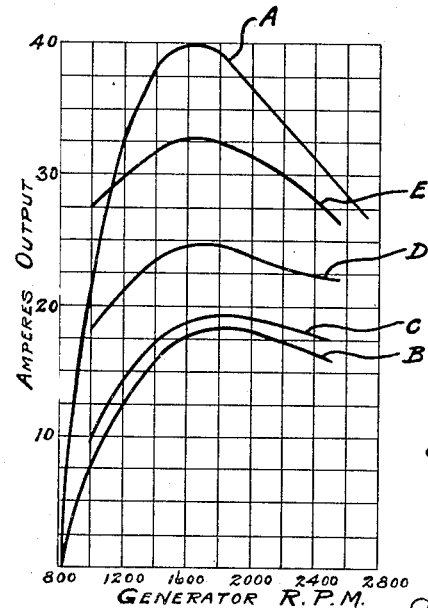
Fig. 3 is a chart illustrating the operation of the invention.

The curves shown in the chart, Fig. 3, are plotted from results obtained with a certain setting of the third brush 24. By shifting the brush 24 the regulation characteristics at different lamp loads will be modified. If it is desired to increase the maximum charge rate of the battery at low lamp load then the maximum output of the generator will be increased. When it is desired to charge the battery at a relatively high rate while the lamps 45 are not burning, the switch 41 is moved to the contact 37 in order to short-circuit the series field winding 35. Then the output to the battery will be as denoted by curve A. If the battery charge rate is then too high, the switch contact 41 may be moved to an intermediate contact 50 connected by wire 51 with a turn of the field winding 35 which is intermediate its end turns so that only a portion of the field winding 35 is short-circuited.

It is to be understood that the chart shown in Fig. 3 is only illustrative of the use of the invention and does not limit the invention to a generator having the speed range and output range indicated by the chart.

What I claim is as follows:

1. An electrical system comprising in combination, a variable speed generator having an armature; a storage battery; a work circuit including electrical translation devices; engine ignition apparatus; a regulating series field included in the generator; and connections for permitting the generator to supply current to the series field and battery and current to the work circuit through a circuit in parallel with the series field and battery, said circuit connections including a switch movable into one position for connecting the ignition apparatus with the battery and generator and movable to another position for connecting the battery with the work circuit and short circuiting the regulating series field winding.

2. An electrical system comprising in combination, a variable speed generator including a regulating series field; a storage battery in series connection with said series field; a circuit including work devices; an ignition device; and a switch movable into one position to connect the ignition device with the generator and movable into another position for disconnecting the ignition device and directly connecting the work devices with the battery.

3. An electrical system comprising in combination, a variable speed generator including a regulating series field winding and an armature; a work circuit including electrical translation devices; a storage battery connected in series with said series field winding; and a switch movable into one position for connecting the work circuit with the generator and movable into another position to disconnect the work circuit from the generator and connect the battery directly with the generator armature.

4. An electrical system comprising in combination, a variable speed generator including an armature; a storage battery; a work circuit including electrical translation devices; means for regulating the generator including a series field winding for said generator; and connections for permitting the generator to supply current to the series field and battery and current to the work circuit through a circuit in parallel with the series field and battery, said connections including a switch movable into one position for connecting the work circuit with the battery and generator, and to another position for disconnecting the work circuit and connecting the battery with the generator and for short-circuiting a portion of the series field winding.

In testimony whereof I hereunto affix my signature.

JOHN T. FITZSIMMONS.